United States Patent [19]
Goto et al.

[11] Patent Number: 4,796,584
[45] Date of Patent: Jan. 10, 1989

[54] INTAKE CONTROL SYSTEM FOR INTERNAL COMBUSTION ENGINE AND INTAKE CONTROL VALVE USED THEREIN

[75] Inventors: Hiroyuki Goto, Anjo; Tokio Kohama, Nishio; Yoshitaka Nishio, Nagoya; Hideki Obayashi, Okazaki; Kazuyuki Horie, Anjo, all of Japan

[73] Assignee: Nippondenso Co., Ltd., Kariya, Japan

[21] Appl. No.: 12,548

[22] Filed: Feb. 9, 1987

[30] Foreign Application Priority Data

Feb. 7, 1986 [JP] Japan .................. 61-26259
Feb. 19, 1986 [JP] Japan .................. 61-34767
May 29, 1986 [JP] Japan .................. 61-125192

[51] Int. Cl.$^4$ .................. F02D 9/08; F02D 9/10
[52] U.S. Cl. .................. 123/403; 123/52 MF
[58] Field of Search .................. 123/52 MF, 336, 337, 123/402, 403, 405, 442

[56] References Cited

U.S. PATENT DOCUMENTS

| | | | |
|---|---|---|---|
| 4,228,772 | 10/1980 | Bakonyi | 123/403 |
| 4,347,812 | 9/1982 | Kosuda et al. | |
| 4,354,459 | 10/1982 | Maxey | 123/405 X |
| 4,363,302 | 12/1982 | Pischinger | |
| 4,422,416 | 12/1983 | Bernardoni | |
| 4,461,151 | 7/1984 | Kamesaka | 123/405 X |
| 4,637,487 | 1/1987 | Nakamura et al. | 123/366 X |
| 4,682,576 | 7/1987 | Nakamura et al. | 123/52 MF X |
| 4,691,670 | 9/1987 | Bonisch et al. | 123/52 MF |

Primary Examiner—Tony M. Argenbright
Attorney, Agent, or Firm—Cushman, Darby & Cushman

[57] ABSTRACT

An intake control system includes an intake control valve disposed in a common intake pipe connected to engine cylinders or a plurality of intake control valves disposed in intake pipes connected respectively to the engine cylinders. The intake control valves are openable and closable under the control of an electronic control unit directly or through respective actuators, based on an electric signal indicative of an operating condition of intake valves on engine cylinders.

25 Claims, 18 Drawing Sheets

# INTAKE CONTROL SYSTEM FOR INTERNAL COMBUSTION ENGINE AND INTAKE CONTROL VALVE USED THEREIN

BACKGROUND OF THE INVENTION

The present invention relates to an intake control system for use in an internal combustion engine, and an intake control valve disposed in an intake pipe and controllable by the intake control system for controlling the flow of an air-fuel mixture in the intake pipe.

When an intake stroke of an engine is started, a burned gas tends to flow from an engine cylinder and an exhaust passage back into an intake passage due to the overlapping operation of intake and exhaust valves, lowering the volumetric efficiency of the engine cylinder. Various devices have heretofore been proposed to increase the volumetric efficiency of internal combustion engines by shutting off the backflow of an air-fuel mixture from the engine cylinder during a final period of the interval in which the intake valve is open. As disclosed in U.S. Pat. No. 4,422,416, one such device comprises a reed valve disposed in an intake duct for preventing the reverse flow of an air-fuel mixture. Another deice comprises a check valve disposed in an intake duct and actuatable by the cam of an associated intake valve, as disclosed in U.S. Pat. No. 4,363,302.

Operation of the disclosed reed valve is governed solely by the intake pressure around the reed valve. Operation of the disclosed check valve is determined solely by the operation of the intake valve cam. Although the air-fuel mixture backflow can be prevented to a limited extent from taking place by those prior intake control valves, it has not been possible to completely prevent the air-fuel mixture backflow by opening and closing the intake passage depenent on operating conditions of the engine, so that the volumetric efficiency will be kept at a maximum.

More specifically, a valve overlapping period in which the intake and exhaust valves are simultaneously opened is determined solely by the cams which open and close the intake and exhaust valves. If such a valve overlapping period is selected to maximize the volumetric efficiency in a low engine speed range, then the volumetric efficiency in a high engine speed range is lowered. Conversely, if the valve overlapping period is selected to maximize the volumetric efficiency in the high engine speed range, then the volumetric efficiency in the low engine speed range is lowered. To eliminate the above shortcoming, it has been proposed to achieve a maximum volumetric efficiency throughout all engine speed ranges by selecting the valve overlapping period to be equal to the period in which the volumetric efficiency in the high speed range is maximized, and which is shorter than the corresponding period in the low speed range. In the low speed range, the timing to open the intake passage is delayed by the intake control valve. Therefore, the valve overlapping period is varied substantially dependent on the rotational speed of the engine. To accomplish the above control process, an intake control valve capable of quickly opening and closing the intake passage is required. The conventional intake control valves have failed to meet such a requirement since they cannot be opened and closed with sufficient response.

The torque vs. speed curve of a commercially available internal combustion engine is indicated by the solid line in FIG. 16 of the accompanying drawings. As shown in FIG. 16, the torque of the engine is smaller in a high speed range than the torque (indicated by the dotted line) of an engine in which cams designed for high-speed operation are employed, and is smaller in in a low speed range than the torque (indicated by the dot-and-dash line) of an engine in which cams designed for low-speed operation are employed.

In view of the above problem, there have been proposed various valve control mechanisms for varying the lift timing of an intake or exhaust valve according to operating conditions of an engine, such as a rotational speed thereof. One proposal is disclosed in U.S. Pat. No. 4,347,812. In the prior valve control mechanisms, the lift timing itself of an intake or exhaust valve is varied according to operating conditions of the engine.

SUMMARY OF THE INVENTION

It is an object of the present invention to provide an intake control system for an internal combustion engine, which system includes a valve that is actuable at a high speed in response to an electric signal for increasing the volumetric efficiency of the engine.

Another object of the present invention is to provide an intake control system for an internal combustion engine, which system is separate from a system for varying the lift timing of intake valves and capable of producing a high torque in a wide range of engine speeds.

Still another object of the present invention is to provide an intake control valve which can quickly be opened and closed for opening and closing an intake passage of an internal combustion engine.

According to the present invention, there is provided an intake control system in a multi-cylinder internal combustion engine having a plurality of engine cylinders connected to a common intake passage and having respective intake valves, the intake control system comprising an intake control valve disposed in the common intake passage, an actuator for selectively opening and closing the intake control valve, and an electronic control unit for operating the actuator based on an electric signal representative of an operating condition of the intake valves.

According to the present invention, there is also provided an intake control system in a multi-cylinder internal combustion engine having a plurality of engine cylinders connected to respective intake passages and having respective intake and exhaust valves, the intake and exhaust valves in each cylinder being openable and closable at a timing for producing a maximum torque in a high speed range, the intake control system comprising a plurality of intake control valves disposed respectively in the intake passages for selectively opening and closing the intake passages, first means for issuing a signal indicative of a rotating condition of the engine, and second means responsive to the signal from the first means for applying a drive signal to actuate each of the intake control valves in order to open the intake passages at a time delayed from opening timings of the corresponding intake valves when the rotational speed of the engine is at most a prescribed speed, to open the intake passages at the same time as the opening timings of the corresponding intake valves when the rotational speed of the engine is higher than the prescribed speed, and to close the intake passages at least while the corresponding intake valves are being closed.

According to the present invention, there is also provided an intake control valve in an intake passage for controlling the flow of an air-fuel mixture therethrough, the intake control valve comprising at least one fixed blade disposed in the intake passage and extending in a direction along the flow of the air-fuel mixture, at least one bimorph blade mounted on the fixed blade, the bimorph blade having one end attached to the fixed blade and the opposite end movable away from the fixed blade upon deformation of the bimorph blade in response to application of a voltage thereto, and at least one valve blade mounted on the fixed blade in overlapping relation to the bimorph blade, the valve blade having one end attached to the fixed blade, the valve blade being resiliently movable by the bimorph blade upon deformation thereof for closing the intake passage.

BRIEF DESCRIPTION OF THE DRAWINGS

The present invention will be described in detail by way of illustrative example with reference to the accompanying drawings, in which.

DETAILED DESCRIPTION

Figure 1:
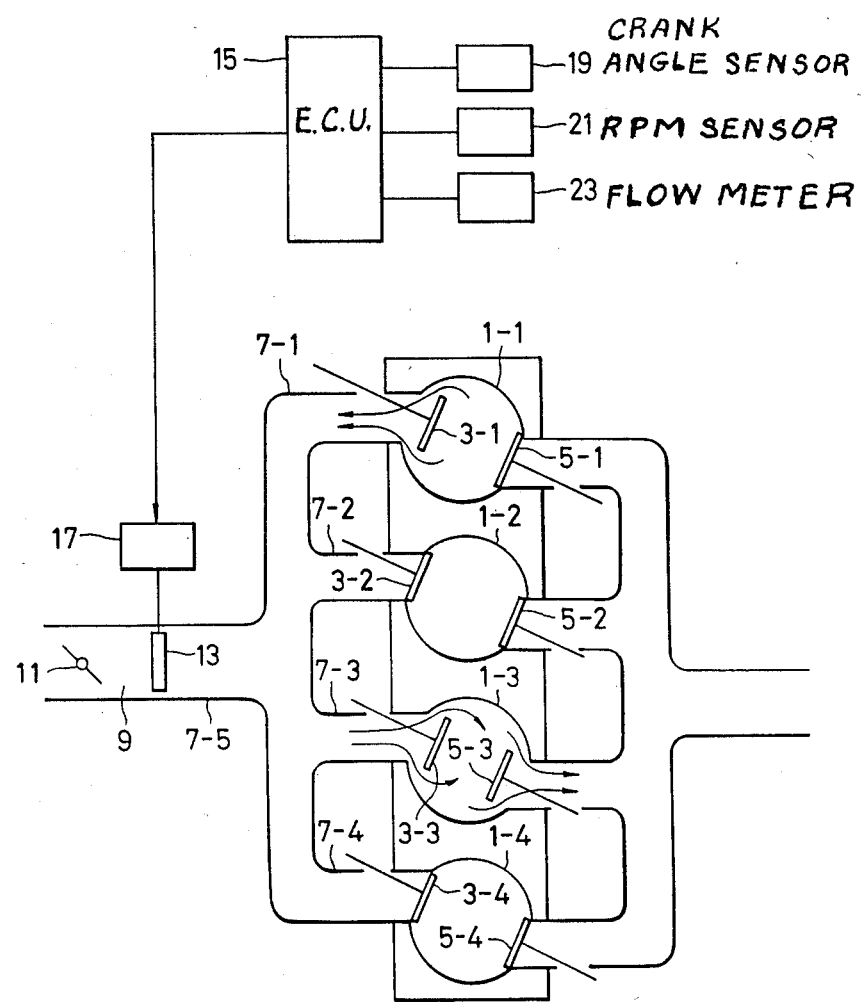
FIG. 1 is a schematic view, partly in block form, of an intake control system according to the present invention.

Like or corresponding parts are denoted by like or corresponding reference characters throughout several views.

FIG. 1 shows an intake control system according to an embodiment of the present invention. The intake control system is combined with a four-cylinder internal combustion engine including four cylinders 1-1, 1-2, 1-3, 1-4 having intake valves 3-1, 3-2, 3-3, 3-4, respectively, and exhaust valves 5-1, 5-2, 5-3, 5-4, respectively.

The intake valves 3-1, 3-2, 3-3, 3-4 are connected to respective branch pipes 7-1, 7-2, 7-3, 7-4 of an intake manifold including a common pipe 7-5 having a common intake passage 9 in which an intake control valve 13 is disposed downstream of a throttle valve 11 in the direction of flow of an air-fuel mixture therethrough. The intake control valve 13 is actuatable, i.e., openable and closable by an actuator 17 operated by an electronic control unit 15 which may comprise a microcomputer. The intake control valve 13 may be disposed upstream of the throttle valve 11.

Figure 2:
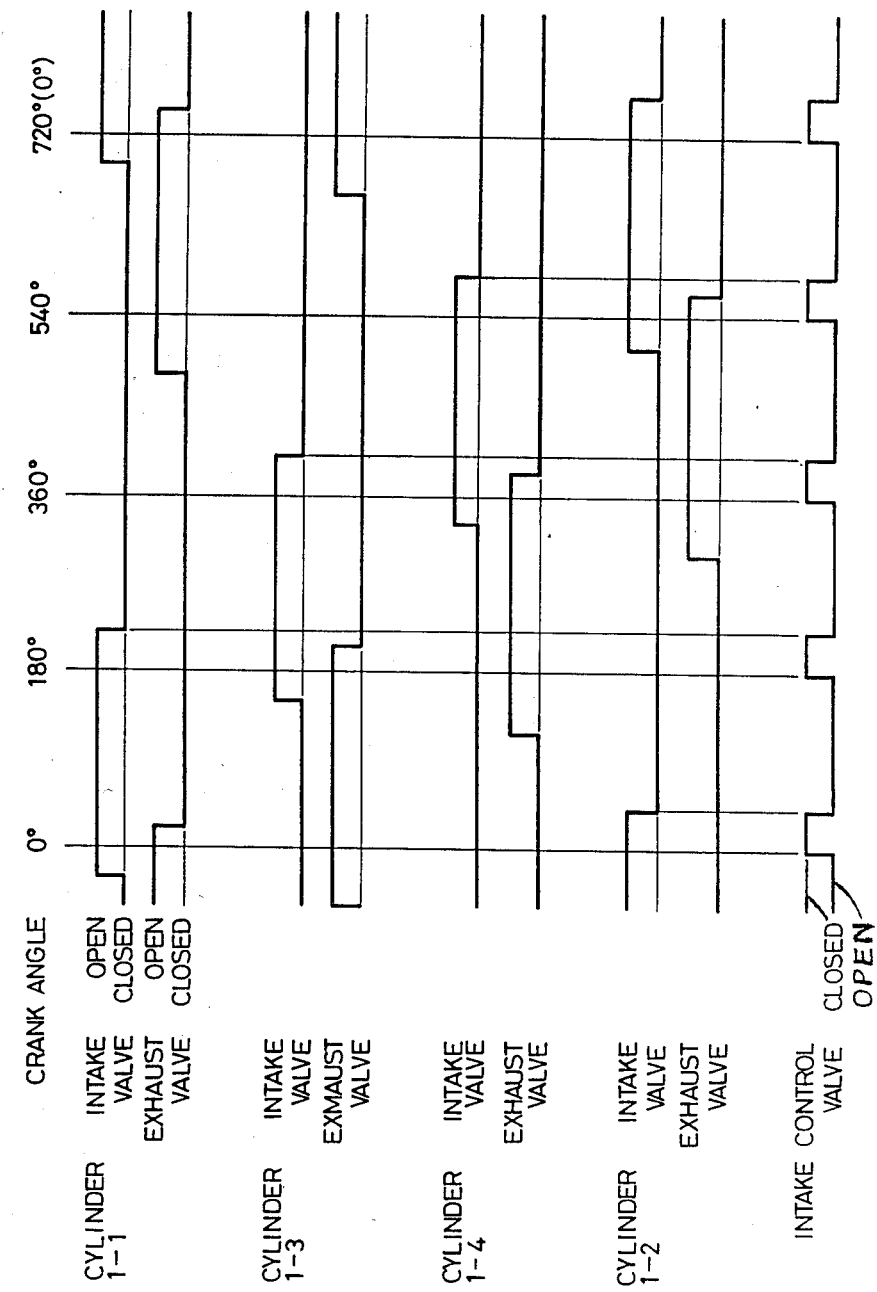
FIG. 2 is a timing chart showing the manner in which an intake control valve is opened and closed with respect to the intake and exhaust valves of engine cylinders by the intake control system of FIG. 1.
Figure 6:
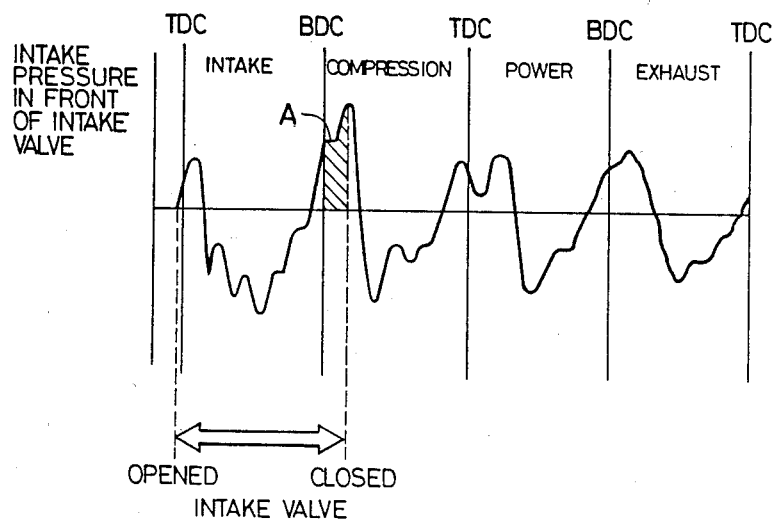
FIG. 6 is a diagram of a waveform representing variations in the intake pressure immediately in front of an intake valve.

As shown in FIG. 2, the intake control valve 13 is closed in the vicinity of crank angles 0°, 180°, 360°, 540°, and opened in the vicinity of times at which the intake valves 3-1, 3-2, 3-3, 3-4 are closed. The timing at which the intake control valve 13 is closed is however not limited to the timing related to the crank angles, as described above. The intake pressure immediately in front of the intake valves 3-1, 3-2, 3-3, 3-4 becomes high as indicated by the shaded area in FIG. 6 during a final period of the interval in which the intake valves are opened. When the intake pressure is thus increased, the air-fuel mixture flows back, i.e., a backflow of the air-fuel mixture occurs (such a backflow is large especially in an engine speed range of from 1,500 to 2,000 rpm). The backflow of the air-fuel mixture would reach an air filter (not shown) positioned upstream of the throttle valve 11, causing various difficulties such as noise and vibration. Therefore, the timing for closing the intake control valve 13 is set to the crank angles at which backflows take place.

The present invention prevents the backflow from occurring immediately before the closing intake valve because the intake control valve is closed immediately before the closing of the intake valve and reopened at the closing of the intake valve. The intake efficiency of the engine is therefore improved during low speed running because the overlap period of the intake valve and the exhaust valve is shortened by a delay time corresponding to the engine speed.

Figure 3:
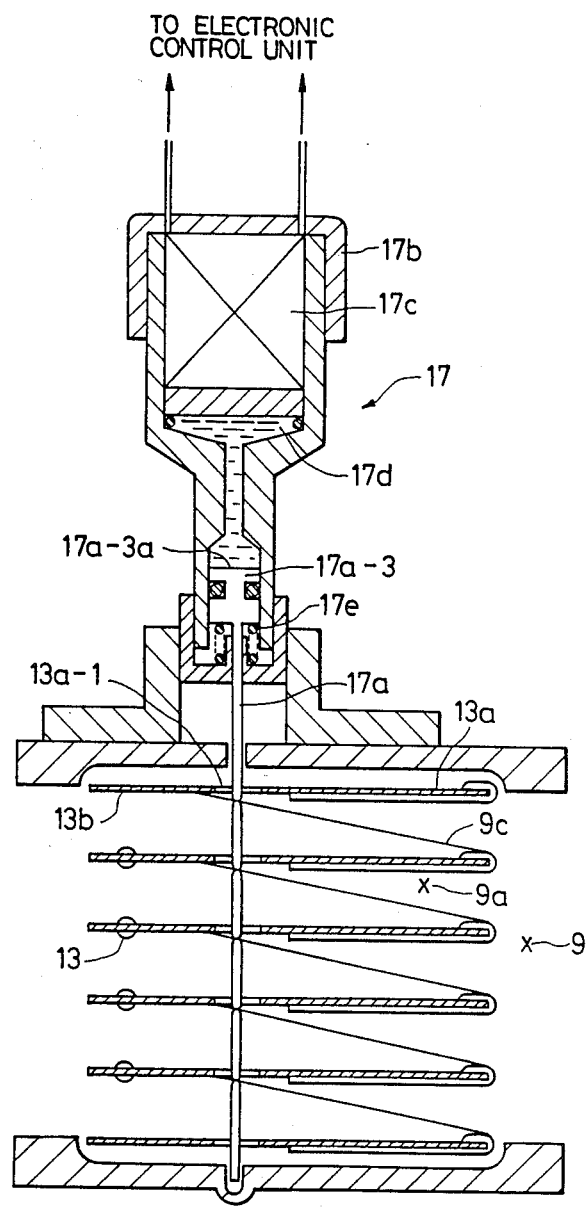
FIG. 3 is a vertical cross-sectional view of the intake control valve and an actuator thereof.

The intake control valve 13 and the actuator 17 are of a unitary structure as shown in FIG. 3, although they may be separate from each other.

Figure 4:
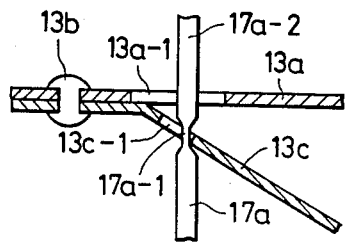
FIG. 4 is an enlarged fragmentary cross-sectional view of portions of the intake control valve and the actuator.
Figure 5:
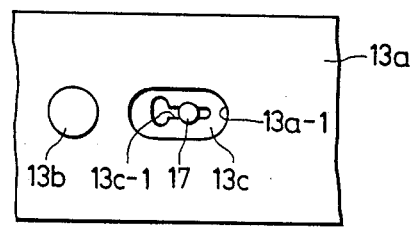
FIG. 5 is an enlarged fragmentary plan view of the portions shown in FIG. 4.

As illustrated in FIG. 3, the intake control valve 13 comprises a plurality of fixed blades 13a spaced at substantially equal intervals in a direction normal to the direction of flow of the air-fuel mixture through the intake passage 9, and a plurality of movable blades 13c having ends fastened by rivets 13b to corresponding ends of the fixed blades 13a, respectively, and opposite ends normally held out of engagement with the opposite ends of the adjacent fixed blades 13a, thus opening intake passageways 9a defined between the fixed blades 13a. As shown in FIGS. 4 and 5, each of the fixed blades 13a has a hole 13a-1 through which a rod 17a of the actuator 17 extends. The rod 17a has alternate thinner and thicker portions 17a-1, 17a-2 with steps therebetween. Each of the movable blades 13c also has a hole 13c-1 through which a thinner portion 17a-1 of the rod 17a extends. When the actuator 17 is operated, the rod 17a is pushed downwardly to cause the step between the thinner and thicker portions 17a-1, 17a-2 to depress each of the movable blade 13c until it abuts against the adjacent lower fixed blade 13a, thereby closing the intake passageway 9a. When the actuator 17 is not in operation, the rod 17a is in a position above the illustrated position to keep the movable blades 13c out of engagement with the fixed blades 13a, so that the intake passageways 9a are open.

As shown in FIG. 3, the rod 17a has a larger-diameter upper end 17a-3 vertically slidably disposed in a housing 17b of the actuator 17. The housing 17b accommodates a laminated piezoelectric device 17c, and has a space defined therein between the piezoelectric device 17c and the rod end 17a-3 and filled with working oil 17d. A spring 17e is also disposed in the housing 17b for normally urging the rod end 17a-3 upwardly into the space in the housing 17b. When a voltage is applied by the electronic control unit 15 to the piezoelectric device 17c, the piezoelectric device 17c produces a mechanical stress tending to reduce the space in the housing 17b. The working oil 17d is therefore caused to depress the end face 17a-3a of the rod end 17a-3 of the rod 17a against the resiliency of the spring 17e until the movable blades 13c of the intake control valve 13 are moved downwardly into engagement with the fixed blades 13a, thereby closing the intake passageways 9a.

The electronic control unit (E.C.U.) 15 is electrically connected to various sensors for detecting operating conditions of the intake valves and the engine. More specifically, these sensors include a crank angle sensor 19 for generating a voltage pulse when the piston in each of the cylinders is at the bottom dead center, a rotational speed sensor 21 for generating a voltage pulse when the crankshaft turns through a prescribed crank angle, and an airflow meter 23 for producing an analog voltage or a digital signal corresponding to the amount of drawn air.

The electronic control unit 15 is responsive to a pulse signal from the crank angle sensor 19 for applying a voltage to the piezoelectric device 17c in the vicinity of the bottom dead center. The electronic control unit 15 then removes the applied voltage in the vicinity of the intake valve closing timing which is commensurate with a prescribed engine rotation angle that is detected by counting pulses generated by the rotational speed sensor 21 after the pulse signal has been produced by the crank angle sensor 19.

Since the intake control valve 13 is closed in the vicinity of the bottom dead center and opened in timed relation to the closing of the intake valves, intake noise and/or intake manifold vibration which is caused by a backflow of the air-fuel mixture produced in a final period of the intake valve opening interval does not reach the open inlet end of the intake manifold. Therefore, such intake noise and intake manifold vibration are reduced. The backflow of the air-fuel mixture is effective in scavenging the other cylinder in which the exhaust valve is opened during the final period of the intake valve opening interval. As a result, the volumetric efficiency of the entire engine is increased.

The above effect of the backflow particularly manifests itself for those engines having as many cylinders as $4 \times n$ (n is an integer of 1 or more). As can be understood from FIG. 2, the flowback of the air-fuel mixture serves to suppress an exhaust gas backflow from the intake valve into the intake manifold during an intial period of the intake valve opening interval of the other cylinder. In the absence of such an exhaust gas backflow, the introduction of the air-fuel mixture into that other cylinder is promoted for a higher volumetric efficiency.

Figure 7:
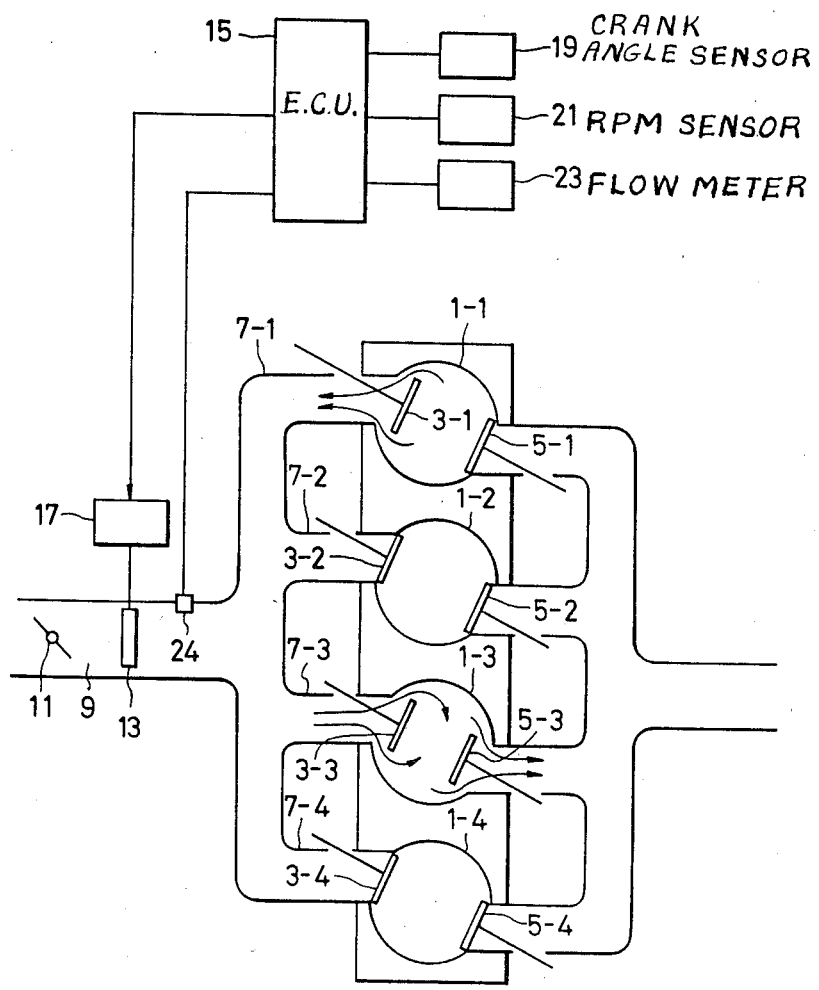
FIG. 7 is a schematic view, partly in block form, of an intake control system according to another embodiment of the present invention.

FIG. 7 shows an intake control system according to another embodiment of the present invention. The intake control system of FIG. 2 differs from that of FIG. 1 in that an intake pressure sensor 24 is mounted on the intake manifold common pipe 7-5 near the intake control valve 13 for detecting the pressure of the air-fuel mixture flowing through the intake passage 9. The intake pressure sensor 24 comprises a semiconductor sensor, for example, which is positioned such that it can generate an electric signal indicative of an air-fuel mixture backflow which takes place in a final period of the intake stroke.

An intake pressure signal from the intake pressure sensor 24 is applied to the electronic control unit 15. The electronic control unit 15 amplifies and shapes the waveform of such an applied intake pressure signal, then converts the same to a digital signal, and processes the digital signal to find a lower density portion of a compression wave representing the intake pulsation in the intake passage 9. When such a lower density portion is found, the electronic control unit 15 applies a voltage to the piezoelectric device 17c in order to close the intake control valve 13. The applied voltage may be removed upon elapse of a predetermined period of time or when the digital signal deviates from a reference level for determining the lower density portion.

Therefore, when a lower density portion of an intake pulsation wave, which is not substantially related to the volumetric efficiency of the engine, appears in the vinicity of the intake control valve 13, the intake control valve 13 is closed to reduce or eliminate intake noise of the engine. Such intake noise reduction or elimination is particularly advantageous when the throttle valve 11 is fully opened.

The intake control valve 13 is shown as being utilized for increasing the volumetric efficiency of an engine, but may also be used for anti-lock brake control and traction control in automobiles.

Figure 8:
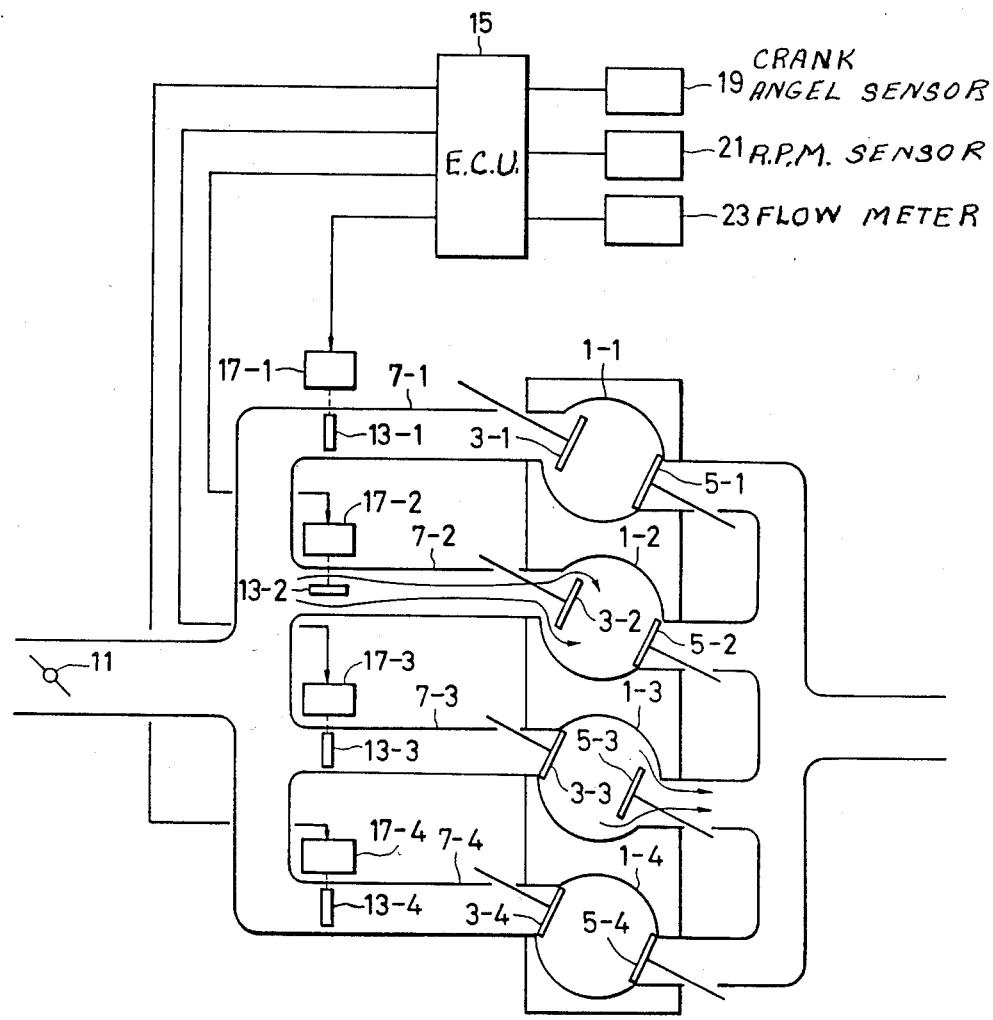
FIG. 8 is a schematic view, partly in block form, of an intake control system according to still another embodiment of the present invention.

According to still another embodiment shown in FIG. 8, an intake control system is similar to the intake control system illustrated in FIG. 1 except that four intake control valves 13-1, 13-2, 13-3, 13-4 are disposed respectively in the branch pipes 7-1, 7-2, 7-3, 7-4 of the intake manifold and operated by respective actuators 17-1, 17-2, 17-3, 17-4 controlled by the electronic control unit 15. The intake valves 3-1, 3-2, 3-3, 3-4 are operated by respective cams (not shown) designed for high-speed operation of the engine.

Figure 9:
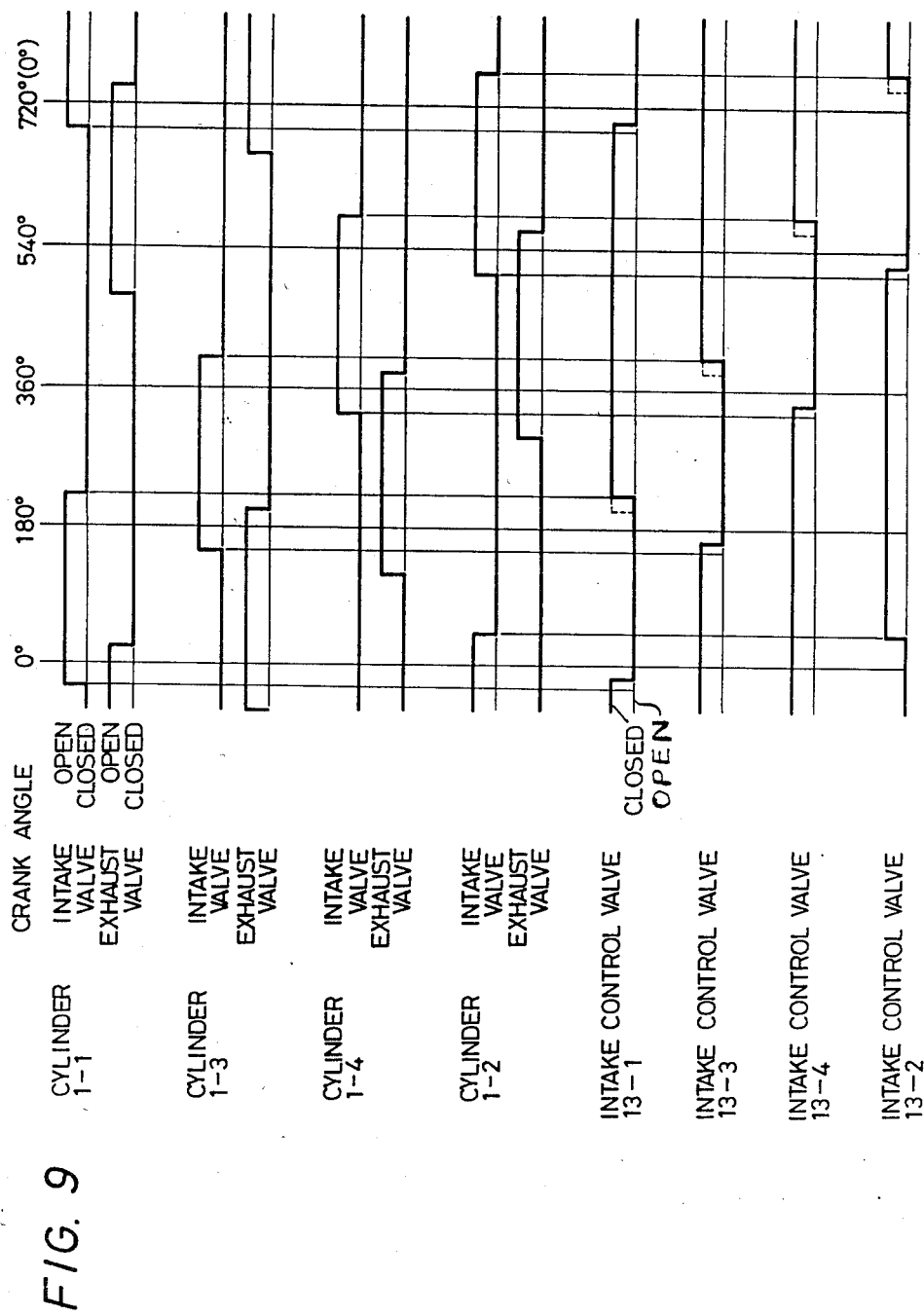
FIG. 9 is a a timing chart showing the manner in which intake control valves are opened and closed with respect to the intake and exhaust valves of engine cylinders by the intake control system of FIG. 8
Figure 17:
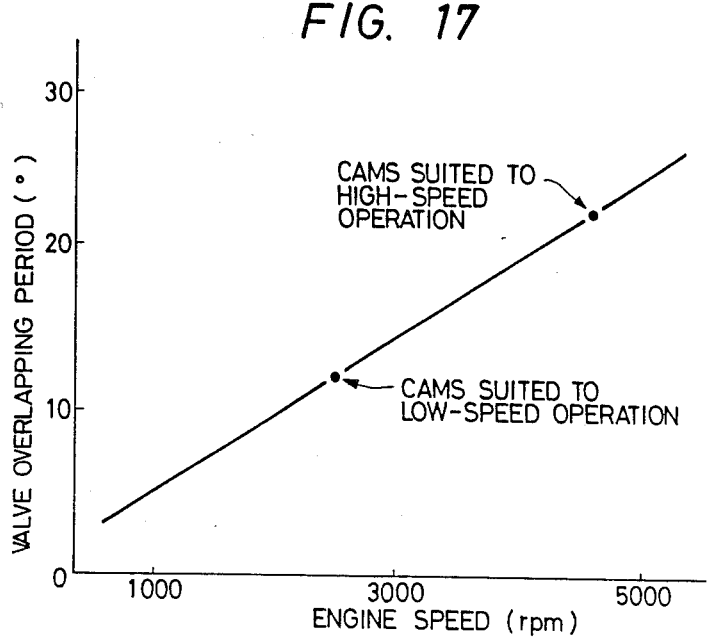
FIG. 17 is a graph showing the relationship betwen a valve overlapping period and an engine rotational speed for a maximum volumetric efficiency.

The intake control valves 13-1, 13-2, 13-3, 13-4 are opened and closed independently of operation of the intake valves 3-1, 3-2, 3-3, 3-4 so that valve overlapping periods in which the intake valves 3-1, 3-2, 3-3, 3-4 and the exhaust valves 5-1, 5-2, 5-3, 5-4 are simultaneously opened will be substantially reduced as the engine speed decreases. Stated otherwise, when the engine speed is higher than an engine speed at which the engine employing the cams suited to high-speed operation can produce a maximum torque, the intake control valves 13-1, 13-2, 13-3, 13-3 are opened in substantially the same periods as those in which the intake valves 3-1, 3-2, 3-3, 3-4 are opened. Below such a reference engine speed, the opening and closing timing of the intake control valves 13-1, 13-2, 13-3, 13-4 is controlled to substantially achieve a valve overlapping period as shown in FIG. 17. FIG. 9 shows the manner in which the intake control valves are operated while the engine is being operated in a speed range lower than the above reference engine speed.

Each of the intake control valves 13-1, 13-2, 13-3, 13-4 is of the same construction as that shown FIGS. 3 through 5.

Figure 10:
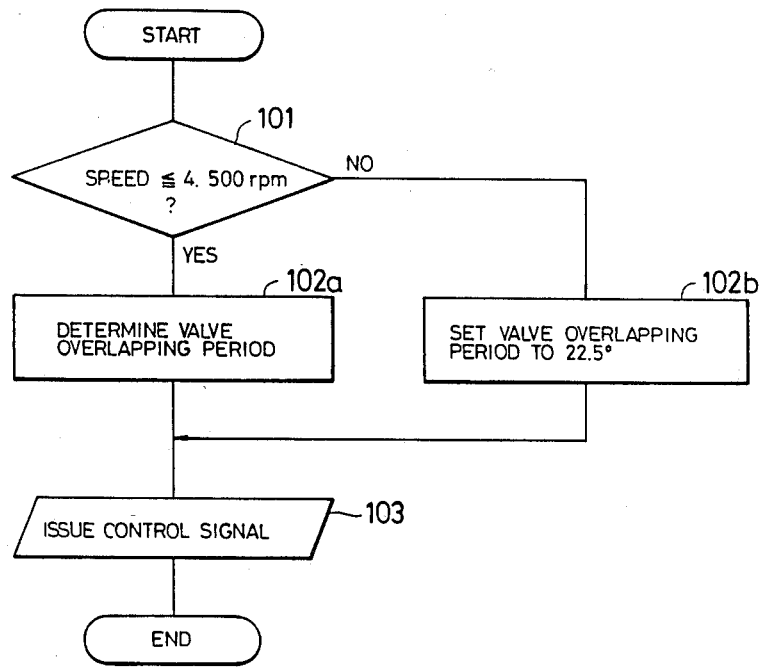
FIG. 10 is a flowchart of operation of an electronic control unit in the intake control system shown in FIG. 8.

The electronic control unit 15 comprises a microcomputer which is programmed to apply control signals to the actuators 17-1, 17-2, 17-3, 17-4 according to an operation sequence as shown in FIG. 10 based on signals supplied from the crank angle sensor 19, the rotational speed sensor 21, and the airflowmeter 23.

A valve overlapping period in which the intake and exhaust valves in each cylinder are simultaneously opened is selected such that the volumetric efficiency is at maximum when the engine rotational speed reaches a high speed such as 4,500 rpm. As shown in FIG. 10, the electronic control unit 15 ascertains in a step 101 whether the rotational speed of the engine is equal to or lower than a reference speed of 4,500 rpm, based on the signal from the rotational speed sensor 21 and data indicative of the speed of 4,500 rpm. The reference rotational speed of 4,500 rpm is a speed at which the cams suited to the high-speed operation can obtain a maximum volumetric efficiency, as described above. Where a rotational speed other than 4,500 rpm is employed for achieving a maximum volumetric efficiency dependent on the cams used, then such a rotational speed is used as a reference speed in the step 101.

If the rotational speed of the engine is equal to or lower than 4,500 rpm in the step 101, then a valve overlapping period capable of achieving the maximum volumetric efficiency is found on the basis of that speed in a step 102a. The valve overlapping period is determined from a map of predetermined valve overlapping periods corresponding to engine rotational speeds used as a parameter. Alternatively, the valve overlapping period may be calculated by an equation representative of the curve of FIG. 17.

If the rotational speed is higher than 4,500 rpm in the step 101, then the valve overlapping period is set to 22.5°, for example, in a step 102b irrespective of the rotational speed. The valve overlapping period of 22.5° is equal to a crank angle which corresponds to a valve overlapping period in which the cams suited to the high-speed operation can achieve the maximum volumetric efficiency. The numerical values 4,500 rpm and 22.5° are given above by way of example only, and may differ from engine to engine and from intake system to intake system.

Thereafter, a control signal is produced on the basis of the valve overlapping period found in the step 102a or set in the spep 102b, and issued to drive the actuator 13-1, 13-2, 13-3, or 13-4 in a step 103.

For each cylinder, a crank angle (hereinafter referred to as a "first crank angle") corresponding to the closing timing of the exhaust valve is assumed from the signals generated by the crank angle sensor 19 and the rotational speed sensor 21, and a crank angle (hereinafter referred to as a "second crank angle") which leads the first crank angle by the crank angle that has been found or determined as above is determined. The control signal is rendered low in order to open, at the second crank angle, the intake control valve which has been closed. Moreover, a crank angle (hereinafter referred to as a "third crank angle") corresponding to the closing timing of the intake valve is assumed from the signals generated by the crank angle sensor 19 and the rotational speed sensor 21. The control signal is rendered high in order to close, at the third crank angle, the intake control valve which has been open.

Therefore, in a speed range equal to or lower than 4,500 rpm, each of the intake control valves 13-1, 13-2, 13-3, 13-4 is opened after the opening timing of the intake valve, and closed at substantially the same timing as the closing timing of the intake valve. In a speed range higher than 4,500 rpm, each intake control valve is opened and closed at substantially the same opening and closing timings of the intake valve.

Figure 16:
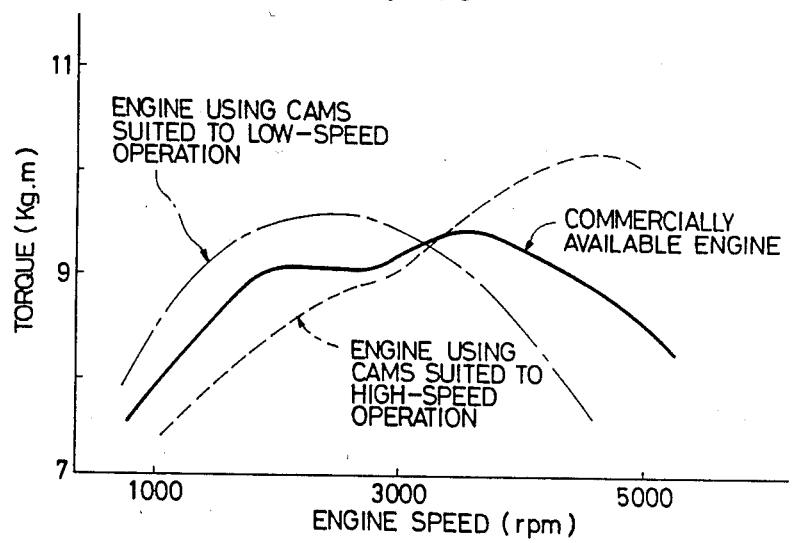
FIG. 16 is a graph illustrating the torque vs. speed characteristics of a commercially available internal combustion engine.

As described above, the intake control valves are disposed respectively in the branch pipes of the intake manifold in the engine which has the intake valves operated by the cams suited to the high-speed operation, and the opening of intake control valves is delayed from the opening timing of the intake valves by a period that is reduced as the rotational speed increases in a speed range equal to or lower than 4,500 rpm, and the intake control valves are closed substantially simultaneously with the closing timing of the intake valves. Thus, in a low speed range of the engine, the timing at which the air-fuel mixture is introduced into the engine is substantially equalized to that obtained if cams suited to low-speed operation were employed, and hence the torque curve indicated by the dot-and-dash line in FIG. 16 can be achieved. The delay of the opening of the intake control valves with respect to the opening of the intake valves is reduced dependent on the rotational speed. Accordingly, a torque curve which is a combination of the maximum torque produced by the cams suited to the low-speed operation and the maximum torque produced by the cams suited to the high-speed operation can be accomplished.

If the intake control valves of the invention were not employed, and if the air-fuel mixture were introduced into the cylinders only under the control of the intake valves operated by the cams suited to the high-speed operation, the opening and closing timings of the intake valves would be determined to maximize the volumetric efficiency in a high-speed range. Consequently, the valve overlapping period in which the intake and exhaust valves are simultaneously opened would be increased as shown in FIG. 17. The condition in which the air-fuel mixture is introduced varies with time. Since the valve overlapping period would be set to a time-dependent angle in order to maximize the pressure in the cylinders in a final period of the intake stroke in the high-speed range, therefore, the valve overlapping period in a low-speed range would be longer than that in the high-speed range. In the low-speed range, therefore, the amount of an exhaust gas flowing in each cylinder toward the intake valve would be increased, and such an increased amount of the exhaust gas would remain in the cylinder, thus lowering the volumetric efficiency.

With the arrangement of the present invention, however, the intake control valve is opened after the opening timing of the intake valve in the low-speed range. Actually, the air-fuel mixture starts being introduced into the cylinder when the intake control valve is opened, and hence the exhaust gas flow into the intake system is suppressed. Stated otherwise, an increased amount of the exhaust gas flows into the exhaust system, so that the exhaust gas is sufficiently discharged from the cylinder due to an increased inertia effect. Such an increased inertia effect is effective to promote the introduction of the air-fuel mixture into the cylinder. As a consequence, the volumetric efficiency remains high in all engine speed ranges, i.e., from the low- to high-speed ranges, enabling the engine to produce a high power output.

It would be best to close the intake valve when the air-fuel mixture has been sufficiently introduced into the cylinder by the pumping effect of the piston and has been pressurized to a maximum pressure higher than the atmospheric pressure due to the inertia. Inasmuch as the closing timing of the intake valve is determined to occur a presribed angle after the bottom dead center, the pressure of the air-fuel mixture introduced in the low-speed range first reaches its maximum value, and then decreases due to a backflow thereof into the intake system. By closing the intake control valve earlier than the closing timing of the intake valve by a period dependent on the rotational speed of the engine, the air-fuel mixture in the cylinder is kept at the maximum pressure from the low- to high-speed ranges.

Figure 11:
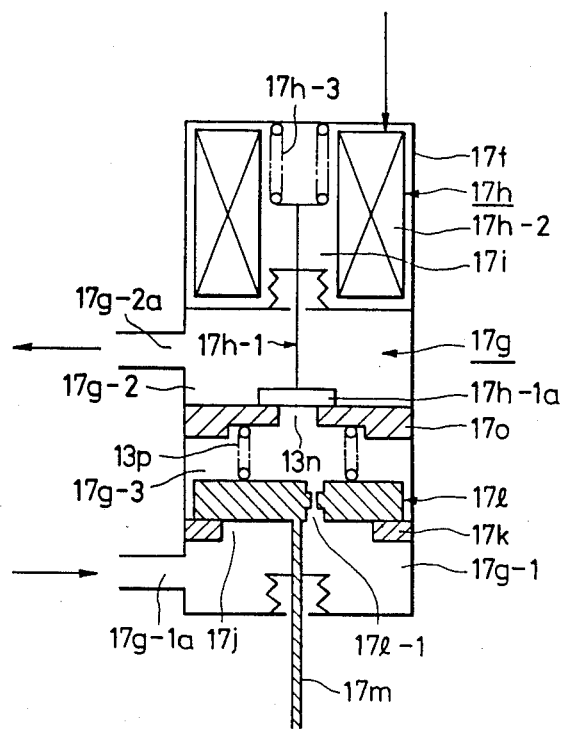
FIGS. 11 and 12 are cross-sectional views of actuators according to other embodiments.

FIG. 11 illustrates an actuator according to another embodiment of the present invention. The actuator comprises a housing $17f$ having an engine oil chamber $17g$ and a control device chamber $17i$ defined therein, the control device chamber $17i$ accommodating therein an oil pressure control device $17h$ for controlling the oil pressure in the engine oil chamber $13g$ based on the output signal from the electronic control unit 15.

The engine oil chamber $17g$ includes first, second, and third oil chambers $17g$-1, $17g$-2, $17g$-3. The first oil chamber $17g$-1 has an inlet port $17g$-1a for introducing high-pressure engine oil into the first oil chamber $17g$-1. The second oil chamber $17g$-2 has an outlet port $17g$-2a for discharing engine oil from the engine oil chamber $17g$ to a lower-pressure exterior. The third oil chamber $17g$-3 is disposed adjacent to and between the first and second oil chambers $17g$-1, $17g$-2.

Between the first and third oil chambers $17g$-1, $17g$-3, there is disposed a first wall $17k$ serving as a stopper for limiting the displacement of a first valve body 171 which is displaceable in the third oil chamber $17g$-3 dependent on the difference between the oil pressures in the first and third oil chambers $17g$-1, $17g$-3. The first wall $17k$ has a first hole $17j$ defined centrally therein and providing communication between the first and third oil chambers $17g$-1, $17g$-3. The first valve 171 is coupled to a push rod $17m$ so that the displacement of the first valve 171 is picked up as that of the push rod $17m$. The first valve 171 has a restriction 171-1 through which the first and third oil chambers $17g$-1, $17g$-3 communicate with each other.

The second oil chamber $17g$-2 and the third oil chamber $17g$-3 are divided from each other by a second wall $17o$ having a second hole $17n$ providing communication between the second oil chamber $17g$-2 and the third oil chamber $17g$-3. The second hole $17n$ is openable and closable by a second valve $17h$-1a of a movable member $17h$-1 of the oil pressure control device $17h$, the movable member $17h$-1 being partly disposed in the second oil chamber $17g$-2. The movable member $17h$-1 closes the second hole $17n$ when the oil pressure control device $17h$ de-energized, and opens the second hole $17n$ when the oil pressure control device $17h$ is energized.

A first spring $17p$ is disposed in the third oil chamber $17g$-3 and has one end engaging the surface of the second wall $17o$ facing the third oil chamber $17g$-3 and the other end the surface of the first valve 171 confronting the second wall $17o$. The first spring $17p$ serves to normally urge the first valve 171 against the first wall $17k$.

The oil pressure control device $17h$ disposed in the control device chamber $17i$ mainly comprises the movable member $17h$-1, a coil $17h$-2, and a second spring $17h$-3 for opening and closing the second hole $17n$ of the second eall $17o$ dependent on the output signal from the electronic control unit 15.

The coil $17h$-2 is selectively supplied or not supplied with an exciting current dependent on the output signal from the electronic control unit 15. When the coil $17h$-2 is de-energized, the movable member $17h$-1 causes the second valve $17h$-1a to close the second hole $17n$ under the resiliency of the second spring $17h$-3. When the coil $17h$-2 is energized, the movable member $17h$-1 is magnetically attracted under the magnetic forces produced by the exciting current passing through the coil $17h$-2, to cause the second valve $17h$-1a to open the second hole $17n$ against the conteracting forces including the resiliency of the second spring $17h$-3.

Operation of the actuator shown in FIG. 11 will be described below. When the coil $17h$-2 of the oil pressure control device $17h$ is de-energized, the second valve $17h$-1a closes the second hole $17n$ under the bias of the second spring $17h$-3. Therefore, the oil pressure in the first oil chamber $17g$-1 and the oil pressure in the third oil chamber $17h$-3 are substantially equal to each other, keeping the first valve 171 held against the first wall $17k$ under the force of the first spring $17p$. The push rod $17m$ joined to the first valve 171 is connected to the intake valve such that when the push rod $17m$ is lowered, the intake valve is closed, and when the push rod $17m$ is lifted, the intake valve is opened. Therefore, when the first valve 171 is held against the first wall $17k$, the push rod $17m$ is in the lowered position and the intake valve remains closed.

When the coil $17h$-2 is energized, the movable member $17h$-1 is is magnetically moved upwardly (FIG. 11) to lift the second valve $17h$-1a off the second wall $17o$ against the resiliency of the second spring $17h$-3, thus opening the second hole $17n$. As long as the coil $17h$-2 remains energized, the second valve $17h$-1a is kept in the lifted position to keep the second hole $17n$ remains open.

Upon the second valve 17h-1a being lifted off the second wall 17o, the high-pressure oil in the third oil chamber 17h-3 flows through the second hole 17n into the lower-pressure second oil chamber 17g-2. Therefore, the oil pressure in the third oil chamber 17h-3 is reduced thereby to allow the first valve 17l to be displaced off the first wall 17k. The push rod 17m is also displaced with the first valve 17l to open the intake control valve.

Insofar as the coil 17h-2 remains energized, the valve 17h-1a keeps the second hole 17n open, and the first valve 17l keeps the first hole 17j open, with the result that the intake control valve remains open.

When the exciting current supplied to the coil 17h-2 is cut off, the magnetic force produced by the coil 17h-2 is eliminated and the movable member 17h-1 is allowed to move downwardly until the valve 17h-1 engages the second wall 17o thereby to close the second hole 17n.

Figure 12:
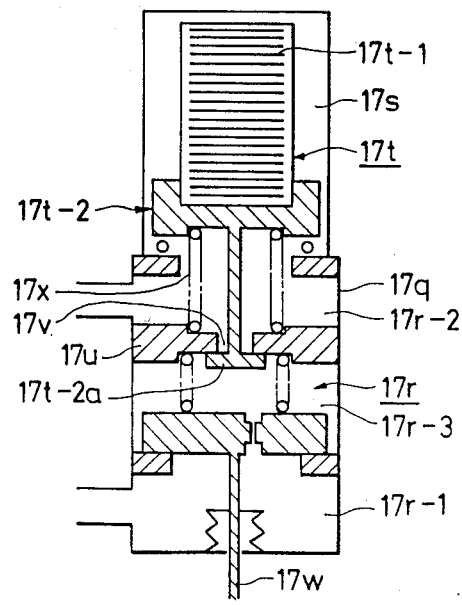

As shown in FIG. 12, an actuator according to still another embodiment includes a housing 17q with its interior divided into an engine oil chamber 17r and a control device chamber 17s. The engine coil chamber 17r is subdivided into first, second, and third chambers 17r-1, 17r-2, 17r-3. Oil pressure in the third oil chamber 17r-3 is controlled by opening and closing a second hole 17v defined in a second wall 17u between the second and third oil chambers 17r-2, 17r-3 under the control of an oil pressure control device 17t disposed in the control device chamber 17s. A push rod 17w coupled to the intake control valve is displaced by the pressure difference developed between the first and second oil chambers 17r-1, 17r-3 under such oil pressure control, for thereby opening and closing the intake control valve.

The oil pressure control device 17t comprises a piezoelectric device 17t-1 which is expanded downwardly (FIG. 12) upon application of a voltage thereto, and a movable member 17t-2 coupled to the piezoelectric device 17t-1 therebelow and positioned thereby, the valve member 17t-2 having a valve 17t-2a disposed in the third oil chamber 17r-3 for opening and closing the second hole 17v. When no voltage is applied to the piezoelectric device 17t-1, the valve 17t-2a closes the second hole 17v in engagement with the second wall 17u under the resiliency of a spring 17x disposed in the second oil chamber 17r-2. In response to a voltage applied to the piezoelectric device 17t-1, it is mechanically deformed against the bias of the spring 17x to lift the valve 17t-2a off the second wall 17u, opening the second hole 17v.

Figure 13:
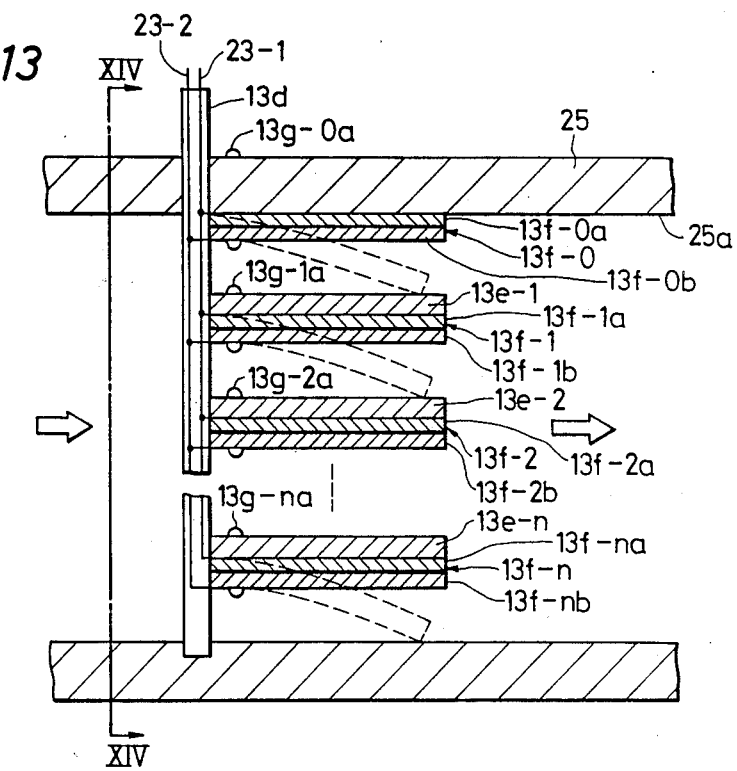
FIG. 13 is a cross-sectional view of an intake control valve according to a further embodiment of the invention.
Figure 14:
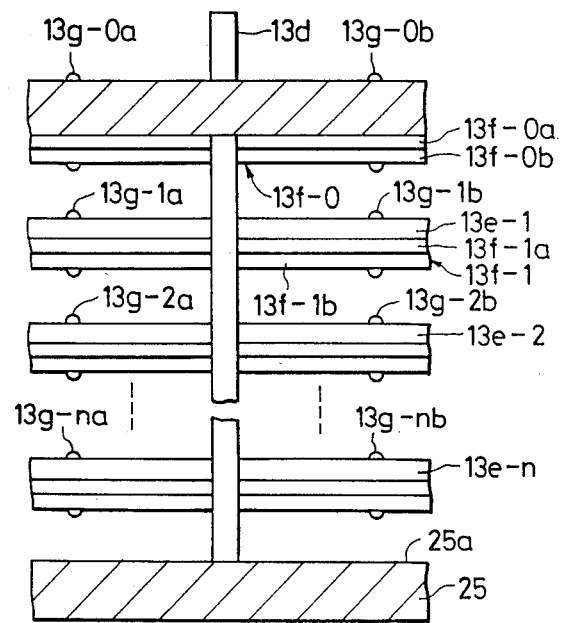
FIG. 14 is a cross-sectional view taken along line XIV—XIV of FIG. 13.

FIGS. 13 and 14 illustrate an intake control valve according to a further embodiment of the present invention. The intake control valve includes a support post 13d coupled to the output of an electronic control unit and vertically supported by an intake pipe 25 in a direction normal to the direction of flow of an air-fuel mixture through the intake pipe 25. Two wires 23-1, 23-2 connected to the electronic control unit are disposed in and along the support post 13d. The intake control valve also includes a plurality of blades 13e-1, 13e-2, . . . 13e-n, mounted on the support post 13d at intervals spaced in a direction normal to the direction of flow of the air-fuel mixture, the blades extending along the direction of flow of the air-fuel mixture. Bimorph blades 13f-1, 13f-2, . . . 13f-n are attached to one (lower) surfaces of the blades 13e-1, 13e-2, . . . 13e-n, respectively, by means of rivets 13g-1a, 13g-1b; 13g-2a, 13g-2b; . . . 13g-na, 13g-nb. Another bimoph blade 13f-o is attached to an upper inner surface of the intake pipe 25 by means of rivets 13g-oa, 13g-ob.

The bimorph blades 13f-1, 13f-2, . . . 13f-n, 13f-o are composed of two joined piezoelectric ceramic plates 13f-1a, 13f-1b; 13f-2a, 13f-2b; . . . 13f-na, 13n-2b; 13f-oa, 13f-ob, respectively. One of the wires 23-1 is connected to electrodes (not shown) the piezoelectric ceramic plates 13f-1a, 13f-2a, . . . 13f-na, 13f-oa, and the other wire 23-2 is connected to electrodes (not shown) the piezoelectric ceramic plates 13f-1b, 13f-2b, . . . 13f-nb, 13f-ob.

Figure 15:
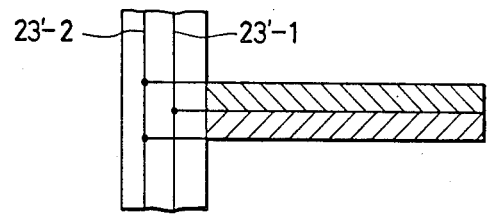
FIG. 15 is a fragmentary view of an intake control valve according to a still further embodiment of the invention.

When there is no potential difference between the wires 23-1, 23-2, the bimorph blades 13f-1, 13f-2, . . . 13f-n, 13f-o are held against the blades 13e-1, 13e-2, . . . 13e-n, and the intake pipe surface 25a, respectively, as shown in FIGS. 13 and 14. A potential difference is given between the wires 23-1, 23-2, the bimorph blades 13f-1, 13f-2, . . . 13f-n, 13f-o are bent downwardly into the dotted-line positions (FIG. 13) in which they engage the opposite (upper) surfaces of the blades 13e-1, 13e-2, . . . 13e-n and the lower inner surface 25a of the intake pipe 25. The bimorph blades are connected in series to each other in FIG. 13. However, they may be connected parallel to each other as shown in FIG. 15 by means of wires 23'-1, 23'-2, between which a potential is applied to operate the bimorph blades as shown in FIG. 13.

Other intake control systems employing intake control valves, for use in automobiles, will be described below.

Modern automotive engines produce higher power and become more responsive. When an accelerator pedal is abruptly depressed while the automobile with such a modern automotive engine is running on a wet or snowy road, the drive wheels tend to spin or slip on the road, making the automobile unstable and dangerous. One of the other intake control systems is designed to prevent the drive wheels from spinning or slipping on the road.

Figure 18:
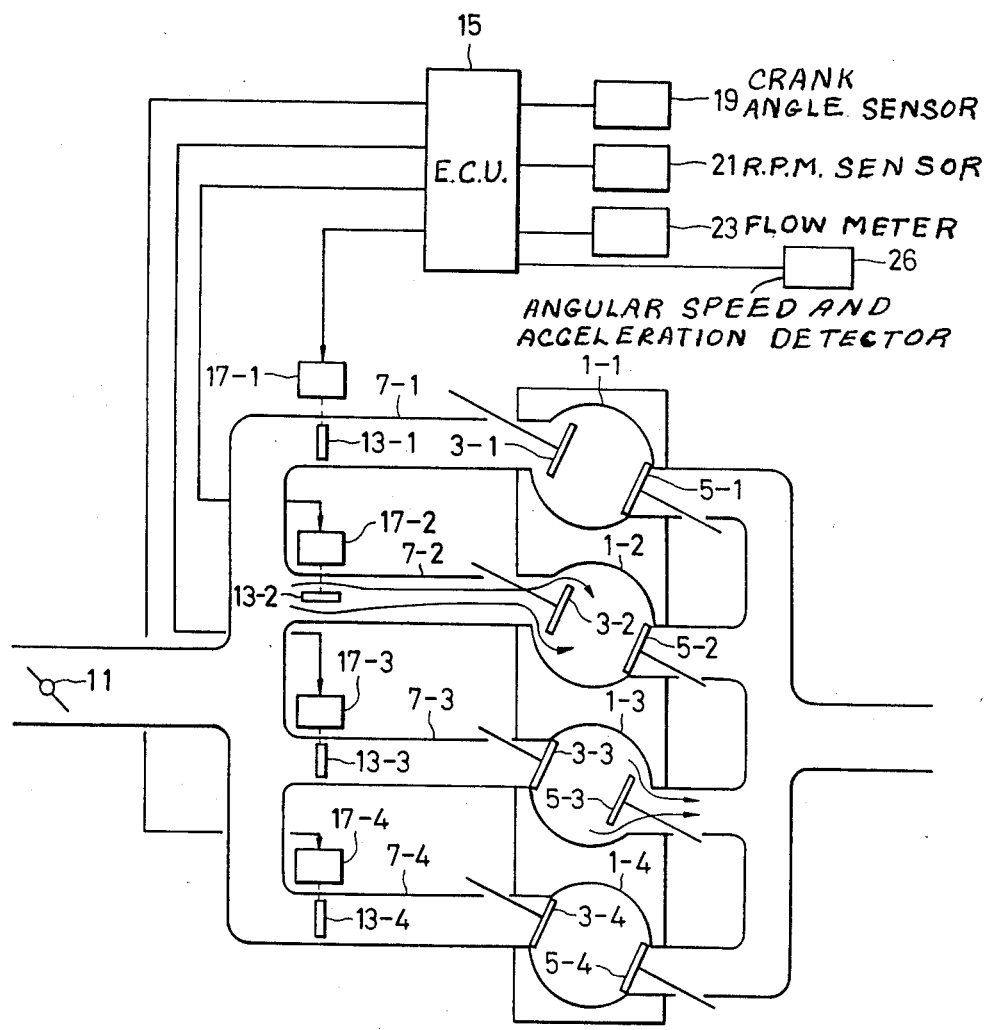
FIGS. 18 and 19 are schematic views, partly in block form, of intake control systems according to still other embodiments of the present invention.

More specifically, as shown in FIG. 18, intake control valves 13-1, 13-2, 13-3, 13-4 are disposed in the respectively branch pipes 7-1, 7-2, 7-3, 7-4 of the intake manifold, and a detector 26 for detecting the angular speed or angular acceleration of an automobile drive wheel is connected to the electronic control unit 15. When the electronic control unit 15 determines that the drive wheels have started to spin based on a signal from the detector 26, the electronic control unit 15 immediately closes or reduces the opening of all or a certain one of the intake control valves 13-1, 13-2, 13-3, 13-4, thus lowering the engine output. When the wheel spin is eliminated thereafter, the electronic control unit 15 opens or increases the opening of the intake control valves 13-1, 13-2, 13-3, 13-4, thus increasing the engine output. Such a cycle of operation is repeated to allow the drive wheels to transmit the maximum torque to the road without spinning or slipping irrespective of how the road condition is bad. Therefore, the automobile can be accelerated safely at a maximum level. The drive wheels also tend to spin or slip when the accelerator pedal is abruptly depressed while the automobile is making a turn. In such a case, the driven wheels can also be prevented from spinning by the above feedback control process, while the maximum torque is being transmitted by the drive wheels safely to the road.

Figure 19:
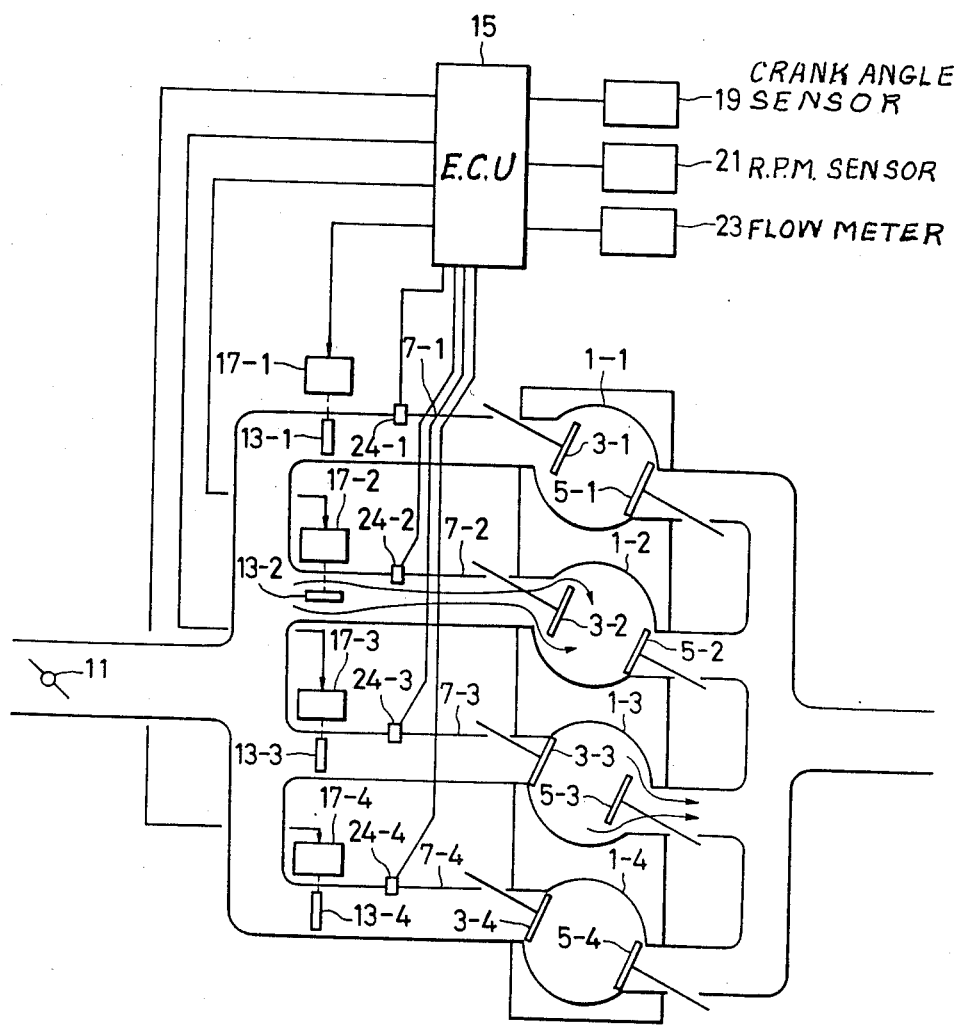

As shown in FIG. 19, another intake control system includes intake pressure sensors 24-1, 24-2, 24-3, 24-4 mounted on the intake branch pipes 7-1, 7-2, 7-3, 7-4, respectively, for detecting the intake pressures therein, the intake pressure sensors 24-1, 24-2, 24-3, 24-4 being connected to the electronic control unit 15. The intake control system of FIG. 19 operates in substantially the same manner as the intake control system of FIG. 7 except that the intake control valves 13-1, 13-2, 13-3, 13-4 are controlled by the electronic control unit 15 based on signals produced by the intake pressure sensors 24-1, 24-2, 24-3, 24-4, respectively.

Figure 20:
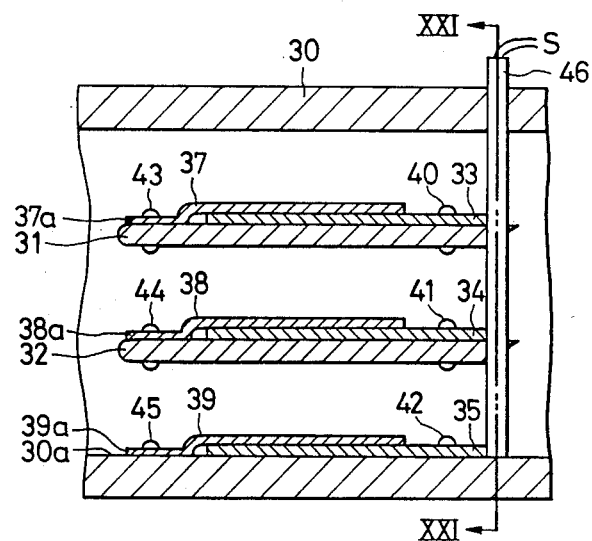
FIG. 20 is a fragmentary cross-sectional view of an intake control valve according to a yet still further embodiment of the present invention.
Figure 21:
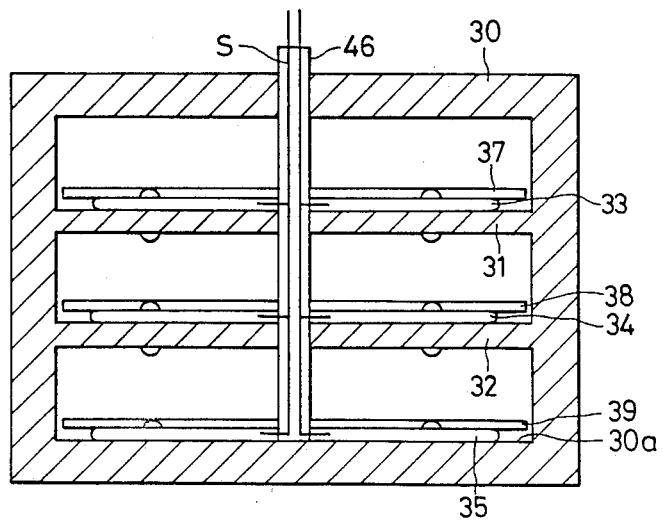
FIG. 21 is a cross-sectional view taken along line XXI—XXI of FIG. 20.
Figure 22:
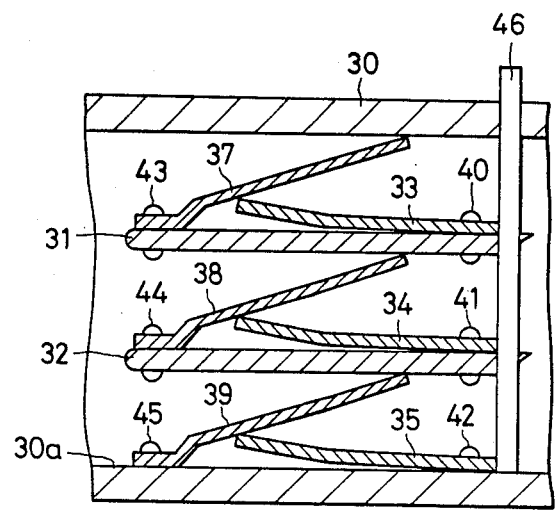
FIG. 22 is a fragmentary cross-sectional view showing the manner in which the intake control valve of FIG. 20 operates.
Figure 23:
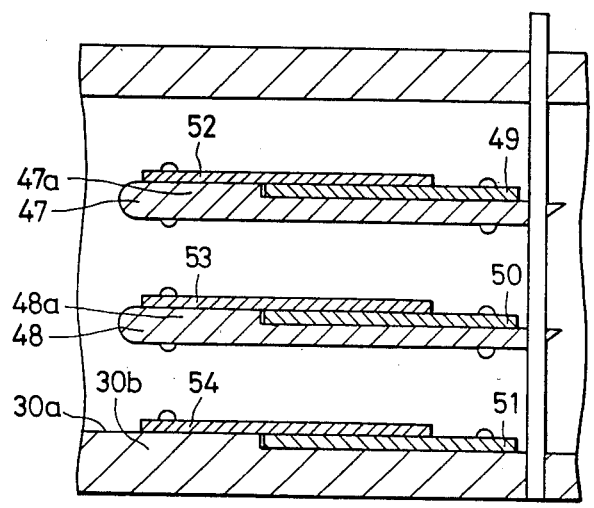
FIGS. 23 and 24 are fragmentary cross-sectional views of an intake control valve according to another embodiment of the present invention.

FIGS. 20, 21, and 23 show an intake control valve according to another embodiment of the present invention. The intake control valve is disposed in an intake pipe 30 and comprises two parallel spaced blades 31, 32 extending in the intake pipe 30 along the flow of an air-fuel mixture through the intake pipe 30, three spaced bimorph blades 33, 34, 35 mounted on the blades 31, 32 and a lower inner wall surface 30a of the intake pipe 30, and three valve blades 37, 38, 39 of a resilient material mounted on the bimorph blades 33, 34, 35, respectively. The bimorph blades 33, 34, 35 are deformable upon application of a voltage thereto as is well known in the art. The bimorph blades 33, 34, 35 have one ends movable away from the blades 31, 32 and the intake pipe surface 30a upon deformation of the bimorph blades 33, 34, 35, and opposite ends fastened to the blades 31, 32 and the intake pipe surface 30a by means of respective rivets 40, 41, 42. The valve blades 37, 38, 39 have ends 37a, 38a, 39a positioned near the movable ends of the bimorph blades 33, 34, 35 and fastened to the blades 31, 32 and the intake pipe surface 30a by respective rivets 43, 44, 45. The fastened ends 37a, 38a, 39a are of a stepped configuration lying below the remaining portions of the valve blades 37, 38, 39 by a distance corresponding to the thickness of the bimorph blades 33, 34, 35. When the bimorph blades 33, 34, 35 are deformed, the valve blades 37, 38, 39 are angularly moved upwardly about the fastened ends 37a, 38a, 39a thereof by the bimorph blades 33, 34, 35 thereby to close the intake passage defined in the intake pipe 30, as shown in FIG. 22. The bimorph blades 33, 34, 35 are electrically coupled to signal wires S passing through a pipe 46 extending transversely through the intake pipe 30 perpendicularly to the flow of the air-fuel mixture therethrough. A voltage can be applied via the signal wires S to the bimorph blades 33, 34, 35 to deform them.

When a voltage is applied via the signal wires S to the bimorph blades 33, 34, 35, they are deformed to an extent dependent on the magnitude of the applied voltage to move their movable ends away from the blades 31, 32 and the intake pipe surface 30a. The valve blades 37, 38, 39 placed on the bimorph blades 33, 34, 35 are therefore engaged at their intermediate portions by the moving ends of the bimorph blades 33, 34, 35 and are lifted to close the intake passage in the intake pipe 30. Therefore, dependent on the degree to which the bimorph blades 33, 34, 35 are deformed, i.e., dependent on the voltage applied thereto, the valve blades 37, 38, 39 are operated to open or close the intake passage to a desired extent. The intake passage can quickly be opened and closed since the bimorph blades 33, 34, 35 can quickly be deformed in response to a voltage applied.

Figure 24:
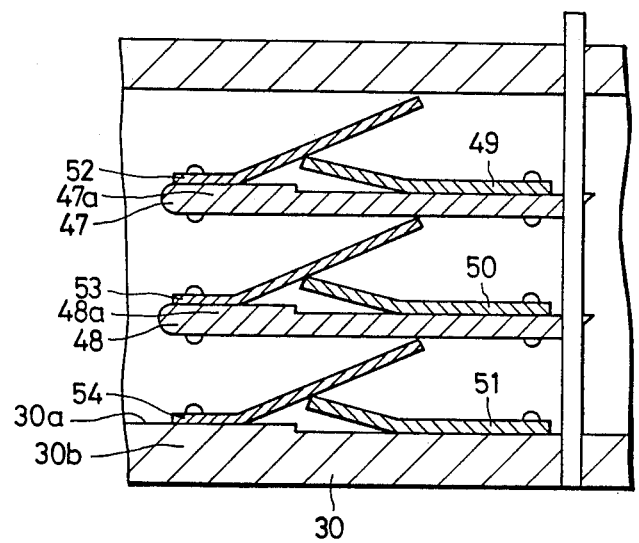

FIGS. 23 and 24 show an intake control valve according to still another embodiment of the present invention. The intake control valve comprises two parallel spaced blades 47, 48 disposed in the intake pipe 30 parallel to the direction of flow of the air-fuel mixture in the intake pipe 30, three bimorph blades 49, 50, 51 mounted on the blades 47, 48 and the intake pipe surface 30a, and three valve blades 52, 53, 54 mounted on the bimorph blades 49, 50, 51, respectively. The valve blades 52, 53, 54 are elastically deformable by deformation of the bimorph blades 49, 50, 51 for opening and closing the intake passage in the intake pipe 30. The blades 47, 48 and the intake pipe surface 30a have respective raised portions 47a, 48a, 30b each having a thickness equal to the thickness of the corresponding bimorph blade. The valve blades 52, 53, 54 are fastened at one ends thereof to the raised portions 47a, 48a, 30b, respectively, by rivets. The valve blades 52, 53, 54 as they are fixed to the raised portions 47a, 48a, 30b are of a flat shape and are not required to be of a stepped configuration as shown in FIG. 20. Accordingly, the valve blades 52, 53, 54 can easily be manufactured. The raised portions 47a, 48a, 30b define steps on the blades 47, 48 and the intake pipe surface 30b, and such steps facilicating the positioning of the bimorph blades 49, 50, 51 on the blades 47, 48 and the intake pipe surface 30b.

Figure 25:
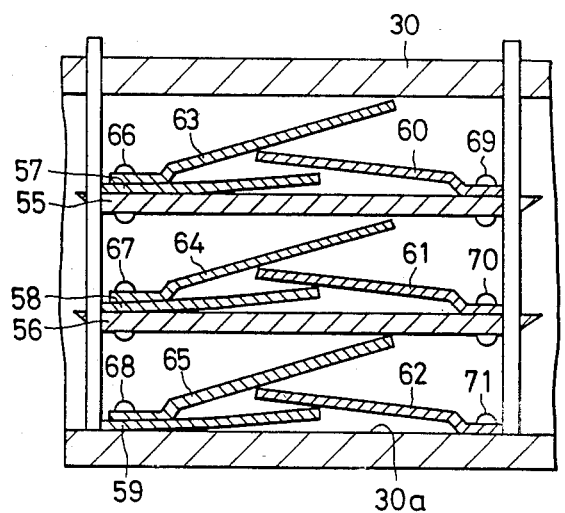
FIGS. 25 and 26 are fragmentary cross-sectional views of intake control valves according to other embodiments of the present invention.

An intake control valve according to yet another embodiment of the present invention is illustrated in FIG. 25. Two parallel spaced blades 55, 56 are disposed in the intake pipe 30. Bimorph blades 57, 58, 59 are mounted on the blades 55, 56 and the intake pipe surface 30a. Three intermediate blades 60, 61, 62 are mounted on the blades 55, 56 and the intake pipe surface 30a, and three valve blades 63, 64, 65 are mounted on the blades 55, 56 and the intake pipe surface 30a in overlapping relation to the intermediate blades 60, 61, 62, respectively. The bimorph blades 57, 58, 59 and the valve blades 63, 64, 65 are fastened together to the blades 55, 56 and the intake pipe surface 30a by means of respective rivets 66, 67, 68. The intermediate blades 60, 61, 62 are fastened to the blades 55, 56 and the intake pipe surface 30a by means of respective rivets 69, 70, 71 remotely from the rivets 66, 67, 68.

When a voltage is applied to the bimorph blades 57, 58, 59 to deform them, the deformation thereof at the free ends thereof is amplified by the intermediate blades 60, 61, 62 before being transmitted to the valve blades 63, 64, 65. Accordingly, the valve blades 63, 64, 65 can well be actuated for quickly opening and closing the intake passage even if the deformation of the bimorph blades 57, 58, 59 is small.

Figure 26:
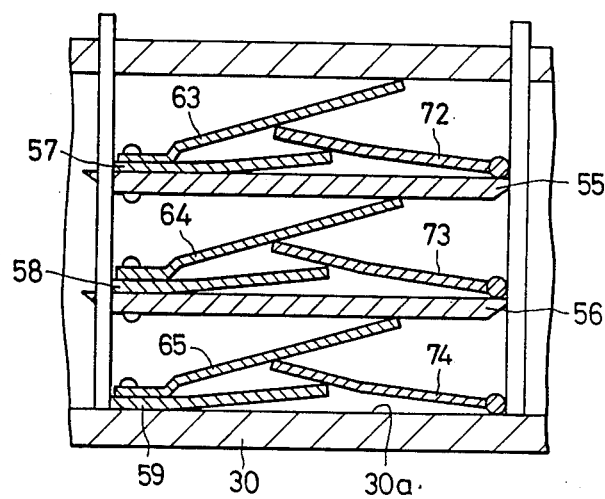

An intake control valve according to a further embodiment shown in FIG. 26 is similar to the intake control valve shown in FIG. 25 except that intermediate bimorph blades 72, 73, 74 are employed in place of the intermediate blades 60, 61, 62 of FIG. 25. The valve blades 63, 64, 65 are operated by the deformation of the bimorph blades 57, 58, 59 and 72, 73, 74. The bimorph blades 72, 73, 74 which are disposed bewteen the bimorph blades 57, 58, 59 and the valve blades 63, 64, 65 are angularly movably mounted on the blades 55, 56 and the intake pipe surface 30a. If the bimorph blades 72, 73, 74 were fixedly mounted on the blades 55, 56 and the intake pipe surface 30a, the fixed ends of the bimorph blades 72, 73, 74 would be subjected to undue stresses and might be broken since the bimorph blades 72, 73, 74 are not only self-deformable but also forcibly deformable by the bimorph blades 57, 58, 59.

The valve blades 63, 64, 65 can well open and close the intake passage even if the deformation of the bimorph blades used is smaller than the deformation of the bimorph blades of FIG. 25 because the valve blades 63, 64, 65 are operated by the two sets of bimorph blades 57, 58, 59 and 72, 73, 74.

Figure 27:
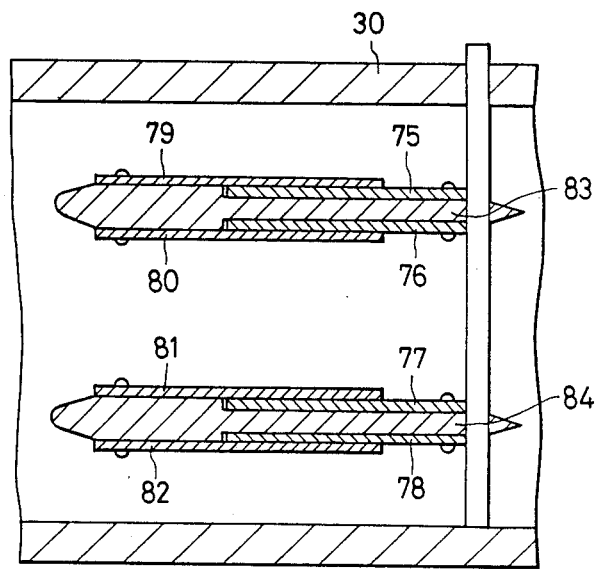
FIGS. 27 and 28 are fragmentary cross-sectional views of an intake control valve according to still another embodiment of the present invention.
Figure 28:
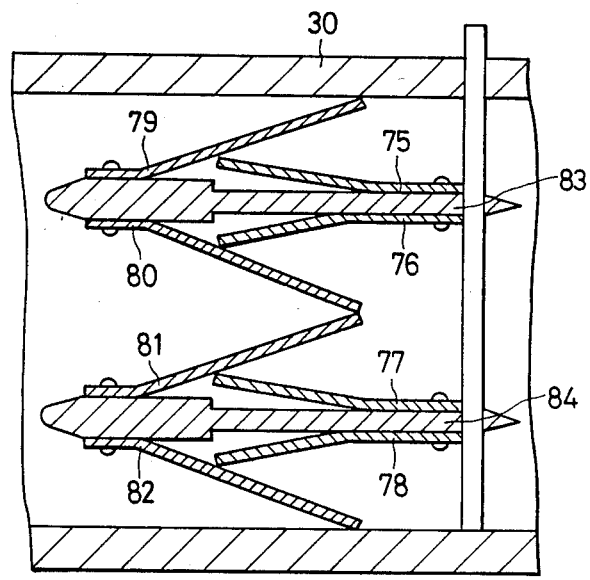

FIGS. 27 and 28 show a still further embodiment in which bimorph blades 75, 76; 77, 78 and valve blades 79, 80; 81, 82 are mounted on opposite surfaces of two parallel spaced blades 83, 84, respectively, disposed in the intake pipe 30. The valve blades 79, 80, 81, 82 are fixed to the raised portions of the blades 83, 84. When the bimorph blades 75, 76, 77, 78 are deformed upon application of a voltage thereto, the valve blades 79, 82 on the outer sides of the blades 83, 84 are moved into contact with the inner wall surface of the intake pipe 30, and the valve blades 80, 81 on the inner sides of the blades 83, 84 are moved into contact with each other at tip ends thereof, thereby closing the intake passage in the intake pipe 30, as shown in FIG. 28.

The intake control valve of FIGS. 27 and 28 can easily be assembled in the intake pipe 30 since no bimorph and valve blades are attached to the inner wall surface of the intake pipe 30. An intermediate blade may be disposed between the blades 83, 84, so that the valve blades 80, 81 can contact such an intermediate blade when closing the intake passage.

Figure 29:
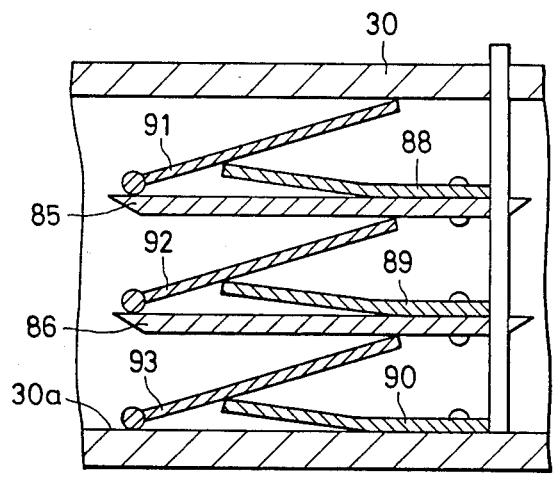
FIG. 29 is a fragmentary cross-sectional view of an intake control valve according to yet another embodiment of the present invention.

FIG. 29 illustrates an intake control valve in accordance with a yet still further embodiment of the present invention. The intake control valve of FIG. 29 is similar to the intake control valve shown in FIG. 1 in that two parallel spaced blades 85, 86 are disposed in the intake pipe 30, three bimorph blades 88, 89, 90 are mounted on the blades 85, 86 and the intake pipe surface 30a, and three valve blades 91, 92, 93 are mounted on the blades 85, 86 and the intake pipe surface 30a in overlapping relation to the bimorph blades 88, 89, 90, respectively. The valve blades 91, 92, 93 are therefore operated upon deformation of the bimorph blades 88, 89, 90 in response to application of a voltage thereto. In the embodiment of FIG. 29, however, the valve blades 91, 92, 93 are angularly movably supported on the blades 85, 86 and the intake pipe surface 30a. As a consequence, the valve blades 91, 92, 93 can be opened and closed smoothly even if the deformation of the bimorph blades 88, 89, 90 is small and hence forces applied thereby to the valve blades 91, 92, 93 are small.

In each of the embodiments of the intake control valves, the bimorph blades and the valve blades may be fixed in position by screws, staking, or welding, rather then the illustrated rivets.

Although certain preferred embodiments of the present invention have been shown and described in detail, it should be understood that various changes and modifications may be made therein without departing from the scope of the appended claims.

We claim:

1. An intake control system in a multi-cylinder internal combustion engine having a plurality of engine cylinders connected to a common intake passage and having respective intake valves, said intake control system comprising:
an intake control valve disposed in said common intake passage;
an actuator for selectively opening and closing said intake control valve; and
an electronic control unit including:
means for generating an electric signal indicative of an operating condition of each said intake valves; and
means for controlling said actuator on the basis of said electric signal so that said intake control valve is set to the closed state at a time earlier by a predetermined time period than a time that said intake valve is switched from the open state to the closed state and set to the open state in response to the closed state of said intake valve.

2. An intake control system according to claim 1, further including an intake pressure sensor mounted in said common intake passage for applying an intake pressure signal indicative of a reduced intake pressure to said electronic control unit to operate said actuator to close said intake control valve.

3. An intake control system as claimed in claim 1, wherein said electronic control unit is responsive to said electric signal so that said intake control valve assumes the closed state when a piston corresponding to one of said plurality of engine cylinders is in the vicinity of the bottom dead center.

4. An intake control system in a multi-cylinder internal combustion engine having a plurality of engine cylinders connected to a common intake passage and having respective intake valves, said intake control system comprising:
an intake control valve disposed in said common intake passage;
an actuator for selectively opening and closing said intake control valve; and
an electronic control unit for operating said actuator based on an electric signal representative of an operating condition of the intake valves,
wherein said intake control valve comprises a plurality of parallel spaced fixed blades disposed in said common intake passage and extending in a direction along the flow of an air-fuel mixture therein and a plurality of movable blades attached at one ends to said fixed blades, respectively, said actuator comprising a push rod extending transversely through said fixed and movable blades and having portions engageable with said movable blades, and a piezoelectric device operable in response to said electric signal for displacing said push rod to move said movable blades toward the adjacent fixed blades for thereby closing said intake passage.

5. An intake control system according to claim 4, wherein said actuator includes a housing accommodating said piezoelectric device therein, said push rod having an end slidably disposed in said housing, said housing including a space defined between said piezoelectric device and said end of said push rod and filled with working oil, so that deformation of said piezoelectric device can be transmitted via said working oil to said end of said push rod.

6. An intake control system according to claim 4, wherein said fixed and movable blades have holes through which said push rod extends, said portions of said push rod comprising steps engageable with edges of the holes of said movable blades.

7. An intake control system according to claim 4, further including a crank angle sensor for producing a voltage pulse when each of pistons in the engine cylinders reaches its bottom dead center, and a rotational speed sensor for producing a voltage pulse each time a crankshaft of the engine rotates through a given crank angle, said electronic control unit being responsive to said voltage pulse from said crank angle sensor for applying a voltage to said piezoelectric device in the vicinity of said bottom dead center and also responsive to a number of voltage pulses generated from said rotational speed sensor after said voltage pulse has been produced by said crank angle sensor for removing said voltage from said piezoelectric device in the vicinity of a time when each of said intake valves is opened.

8. An intake control system in a multi-cylinder internal combustion engine having a plurality of engine cylinders connected to respective intake passages and having respective intake and exhaust valves, said intake and exhaust valves in each cylinder being openable and closable at a timing for producing a maximum torque in a high speed range, said intake control system comprising:
a plurality of intake control valves disposed respectively in said intake passages for selectively opening and closing the intake passages;
first means for issuing a signal indicative of a rotating condition of said engine; and
second means responsive to said signal from said first means for applying a drive signal to actuate each of said intake control valves in order to open the intake passages at a time delayed from opening timings of the corresponding intake valves when the rotational speed of the engine is at most a prescribed speed, to open the intake passages at the same time as the opening timings of the corresponding intake valves when the rotational speed of the engine is higher than said prescribed speed, and to close the intake passages at least while the corresponding intake valves are being closed.

9. An intake control system according to claim 8, wherein said first means comprises a rotational speed sensor for detecting a rotational speed of said engine.

10. An intake control system according to claim 8, wherein said second means include a plurality of actuators mechanically connected to said intake control valves, respectively, for operating the intake control valves.

11. An intake control system according to claim 10, wherein each of said actuators comprises a first valve normally resiliently biased to close a first hole and coupled to one of said intake control valves, a second valve normally resiliently biased to close a second hole and movable for opening said second hole, a fluid flowable under pressure through said first and second holes, and a solenoid coil energizable by said drive signal for moving said second valve to open said second hole to move said first valve to open said first hole under the pressure of said fluid for thereby opening said intake control valve.

12. An intake control system according to claim 10, wherein each of said actuators comprises a first valve normally resiliently biased to close a first hole and coupled to one of said intake control valves, a second valve normally resiliently biased to close a second hole and movable for opening said second hole, a fluid flowable under pressure through said first and second holes, and a piezoelectric device deformable by said drive signal for moving said second valve to open said second hole to move said first valve to open said first hole under the pressure of said fluid for thereby opening said intake control valve.

13. An intake control system according to claim 8, wherein each of said intake control valves comprises a plurality of parallel spaced fixed blades disposed in one of said intake passages and extending in a direction along the flow of an air-fuel mixture therein, a plurality of movable bimorph blades attached at one ends to said fixed blades, respectively, each of said bimorph blades comprising a pair of joined piezoelectric ceramic plates, and signal wires connected to said piezoelectric ceramic plates of said bimorph blades for applying said drive signal to said bimorph blades.

14. An intake control system according to claim 13, wherein said piezoelectric ceramic plates of said bimorph blades are connected in series to each other by said signal wires.

15. An intake control system according to claim 13, wherein said piezoelectric ceramic plates of said bimorph blades are connected parallel to each other by said signal wires.

16. An intake control system according to claim 8, further including a detector for producing a signal indicative of a rotating condition of a wheel rotatable by said engine, said second means being responsive to said signal from said detector.

17. An intake control system according to claim 8, further including a plurality of intake pressure sensors mounted in said intake passages, respectively, for applying intake pressure signals indicative of reduced intake pressures to said second means to close said intake control valves.

18. An intake control valve in an intake passage for controlling the flow of an air-fuel mixture therethrough, said intake control valve comprising:
at least one fixed blade disposed in said intake passage and extending in a direction along the flow of the air-fuel mixture;
at least one bimorph blade mounted on said fixed blade, said bimorph blade having one end attached to said fixed blade and the opposite end movable away from said fixed blade upon deformation of the bimorph blade in response to application of a voltage thereto; and
at least one valve blade mounted on said fixed blade in overlapping relation to said bimorph blade, said valve blade having one end attached to said fixed blade, said valve blade being resiliently movable by said bimorph blade upon deformation thereof for closing said intake passage.

19. An intake control valve according to claim 18, wherein said attached end of said valve blade is of a stepped shape lying below the remaining portion of said valve blade by a distance equal to the thickness of said bimorph blade.

20. An intake control valve according to claim 18, wherein said fixed blade has a raised portion defining a step, said attached end of said valve blade being fixed to said raised portion, said bimorph blade being positioned by said step.

21. An intake control valve according to claim 18, further including an intermediate blade mounted on said fixed blade and positioned between said bimorph blade and said valve blade.

22. An intake control valve according to claim 21, wherein said intermediate blade is angularly movably mounted on said fixed blade.

23. An intake control valve according to claim 18, wherein two bimorph blades are mounted on opposite surfaces of said fixed blade, and two valve blades are mounted on the opposite surfaces of said fixed blade in overlapping relation to said bimorph blades, respectively.

24. An intake control valve according to claim 18, wherein said valve blade is angularly movably mounted on said fixed blade at said attached end.

25. An intake control valve according to claim 18, wherein each of said attached end is fastened by a rivet to said fixed blade.

* * * * *